US011539535B2

(12) United States Patent
Martineau et al.

(10) Patent No.: US 11,539,535 B2
(45) Date of Patent: Dec. 27, 2022

(54) GENERATING AN AUTHENTICATION RESULT BY USING A SECURE BASE KEY

(71) Applicant: CRYPTOGRAPHY RESEARCH, INC., Sunnyvale, CA (US)

(72) Inventors: Philippe Alain Martineau, Saint Paul Lez Durance (FR); Helena Handschuh, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 343 days.

(21) Appl. No.: 16/339,172

(22) PCT Filed: Oct. 5, 2017

(86) PCT No.: PCT/US2017/055410
§ 371 (c)(1),
(2) Date: Apr. 3, 2019

(87) PCT Pub. No.: WO2018/067865
PCT Pub. Date: Apr. 12, 2018

(65) Prior Publication Data
US 2019/0238347 A1 Aug. 1, 2019

Related U.S. Application Data

(60) Provisional application No. 62/435,197, filed on Dec. 16, 2016, provisional application No. 62/405,178, filed on Oct. 6, 2016.

(51) Int. Cl.
*H04L 9/32* (2006.01)
*H04L 9/08* (2006.01)
(52) U.S. Cl.
CPC .......... *H04L 9/3271* (2013.01); *H04L 9/0822* (2013.01); *H04L 9/0827* (2013.01); *H04L 2209/80* (2013.01)

(58) Field of Classification Search
CPC ... H04L 9/3271; H04L 9/0822; H04L 9/0827; H04L 2209/80
See application file for complete search history.

(56) References Cited

U.S. PATENT DOCUMENTS

| 5,481,611 A | 1/1996 | Owens et al. |
| 10,420,055 B2 * | 9/2019 | Zhang ..................... G06F 21/44 |

(Continued)

FOREIGN PATENT DOCUMENTS

WO    WO-2016-032975 A1    3/2016

OTHER PUBLICATIONS

Notification Concerning Transmittal of the International Preliminary Report on Patentability dated Apr. 18, 2019 re: Int'l Appln. No. PCT/US2017/055410. 8 Pages.

(Continued)

*Primary Examiner* — Trong H Nguyen
*Assistant Examiner* — Hamid Talaminaei
(74) *Attorney, Agent, or Firm* — Lowenstein Sandler LLP

(57) ABSTRACT

An encrypted sequence that includes an authentication key may be received. A base key stored at a device may be identified and the encrypted sequence may be decrypted with the base key to obtain the authentication key. A challenge value may be received and the authentication key may be combined with the challenge value to generate a device ephemeral key. An authentication result may be generated for the device based on a combination of the device ephemeral key and the challenge value. Furthermore, the authentication result may be transmitted to a mobile network to authenticate the device.

20 Claims, 7 Drawing Sheets

(56) References Cited

U.S. PATENT DOCUMENTS

| | | | |
|---|---|---|---|
| 2008/0080558 A1 | 4/2008 | Wang et al. | |
| 2011/0016321 A1* | 1/2011 | Sundaram | H04L 67/34 713/171 |
| 2012/0213361 A1* | 8/2012 | Lim | H04L 63/0428 380/44 |
| 2014/0044265 A1* | 2/2014 | Kocher | G06F 21/57 380/277 |
| 2015/0163056 A1* | 6/2015 | Nix | H04W 12/06 380/46 |
| 2017/0208045 A1* | 7/2017 | Huh | H04L 63/0428 |
| 2017/0373845 A1* | 12/2017 | Nix | H04L 9/3247 |
| 2019/0089532 A1* | 3/2019 | Lambert | H04W 8/24 |

OTHER PUBLICATIONS

Notification of Transmittal of the International Search Report and the Written Opinion of the International Searching Authority, or the Declaration dated Dec. 26, 2017 re: Int'l Appln. No. PCT/US17/055410. 9 Pages.

\* cited by examiner

GENERATING AN AUTHENTICATION RESULT BY USING A SECURE BASE KEY

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
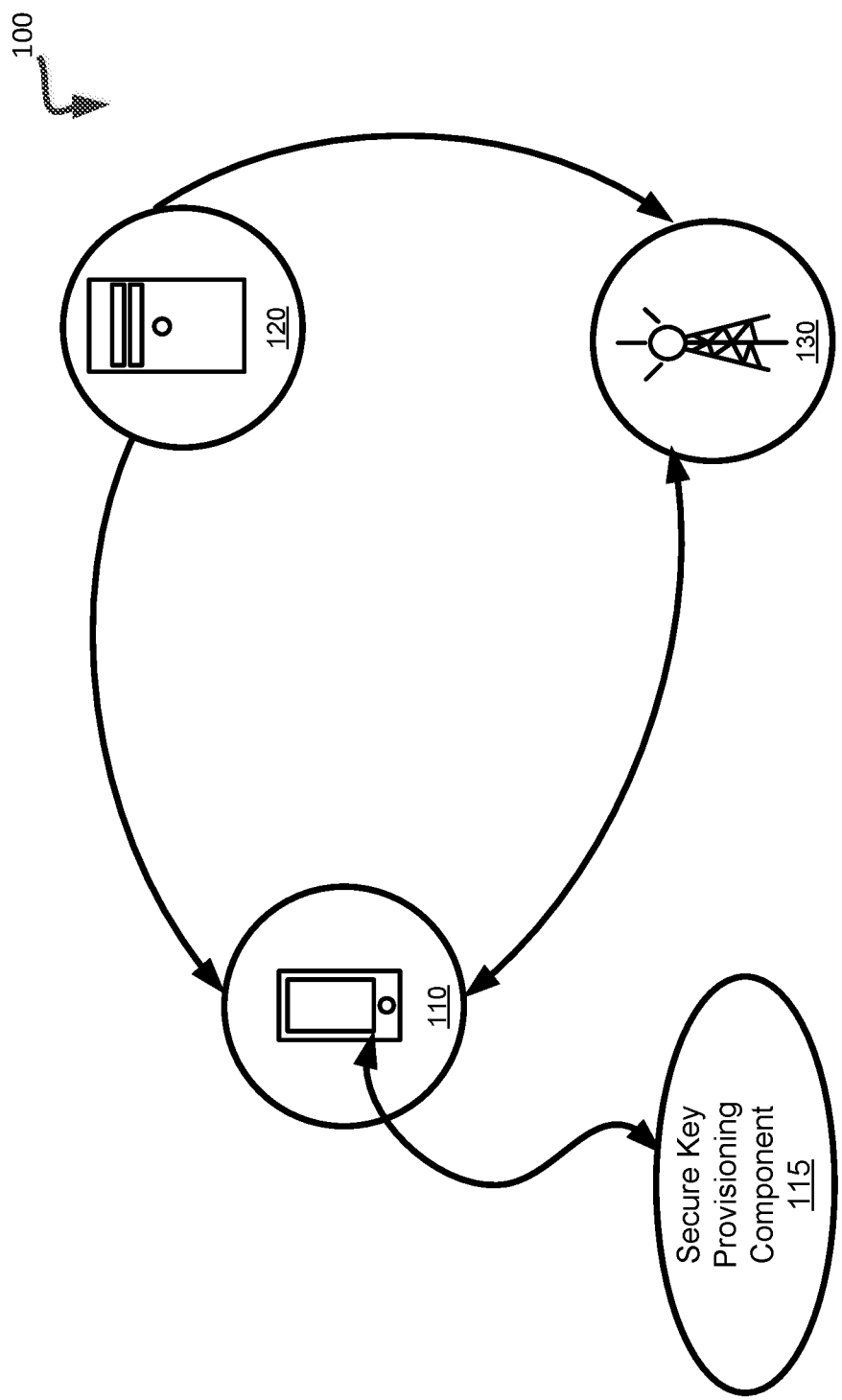
FIG. 1 illustrates an example environment with a device that includes a secure key provisioning component in accordance with some embodiments of the present disclosure.

Aspects of the present disclosure relate to the generation of an authentication result for authenticating a device with a mobile network by using a secure base key. The authentication result may be generated by using the base key that is securely stored in a device and may subsequently be used to authenticate the device with a mobile network. As an example, the mobile network may correspond to a cellular network and the device may correspond to a mobile communications device (e.g., a cellular phone or smartphone) or any other type of mobile device (e.g., an Internet of Things (IoT) device). The authentication result may be derived or generated by the device and transmitted to a node or endpoint of the mobile network (e.g. a cellular tower) to authenticate the device for use with the mobile network.

The generation of an authentication result may correspond to functionality of a subscriber identity module or a subscriber identification module (SIM) card that is used by a device. The SIM card may store an international mobile subscriber identity (IMSI) and an authentication key ($K_i$) that is used to identify and authenticate subscribers of the mobile network from the device. For example, upon an initialization or powering on of the device, the IMSI stored on a SIM card may be transmitted to a network operator of the mobile network. The network operator (e.g., a server of the mobile network) may generate a random value (e.g., a cryptographic challenge value) and retrieve an authentication key that is known by the network operator to correspond to the received IMSI. The network operator may further generate an authentication result based on the authentication key and the generated random value. Furthermore, the network operator may transmit the generated random value to the device, which may subsequently generate an authentication result based on the authentication key that is stored on the SIM card and the generated random value received from the network operator of the mobile network. The device may transmit its generated authentication result to the network operator, which may compare its generated authentication result with the authentication result generated by the device. If the two authentication results match, then the device may be considered to be successfully authenticated for use with the mobile network. For example, the device may use a communications function in conjunction with the mobile network.

The use of a SIM card with a device may require additional area for an integrated circuit of the device and introduce additional complexity to the integrated circuit. Instead of using a SIM card, the functionality of the SIM card may be replaced by a secure base key provisioning component that may be based on a hardware component and an embedded software component. For example, the functionality of the SIM card may be replaced by a secure hardware component, embedded software component, and a provisioning server. The secure hardware component may securely store a base key that is not exported or transmitted externally from the secure hardware component. For example, operations using the base key may be performed from within the secure hardware component. The base key may be provided or provisioned in the secure hardware component at manufacturing or fabrication of the secure hardware component. The base key may be unique to a particular device. A provisioning server (e.g., a server from a separate network than the mobile network to which the device is seeking to authenticate) may provide an encrypted sequence that may include an authentication key and one or more instructions to be performed by the secure hardware component. The encrypted sequence may be stored within the embedded software component that corresponds to a non-secure environment. The encrypted sequence may be retrieved by the secure hardware component and the base key may be used to decrypt the encrypted sequence within the secure hardware component to obtain the authentication key and one or more instructions. Subsequently, the instructions may be performed by the secure hardware component to combine the authentication key with a generated random value received from the provisioning server. In some embodiments, the generated random number may be received from the mobile network. For example, the provisioning server may provide the generated random number to the mobile network which may subsequently transmit the random number to the device when the device attempts to authenticate with the mobile network. For example, an authentication process may be performed by the embedded software component of the device based on a combination of the authentication key and the received random value to generate an authentication result. Subsequently, the authentication result may be provided to the mobile network to authenticate the device with the mobile network.

Furthermore, the use of the base key in the secure hardware component may allow for the generation of multiple authentication results for different subscribers or different mobile networks on the same device. For example, the secure hardware component may store one base key and the embedded software component may store multiple encrypted sequences with different authentication keys and different instructions that correspond to different subscribers or different mobile networks. The provisioning server may provision different encrypted sequences to the embedded software component of the device (e.g., software executed by the secure base key provisioning component) so that different encrypted authentication keys are stored at the embedded software component of the device. When the device attempts to connect to a first mobile network, then a first authentication result may be generated by using the base key to decrypt a corresponding encrypted sequence to obtain a corresponding authentication key and combining the authentication key with a randomly generated value received from the provisioning server or from the mobile network. If the device attempts to connect to a second mobile network, then the same base key may be used to decrypt another encrypted sequence to obtain another authentication key which may be combined with another randomly generated value received from the provisioning server or the second mobile network. As such, a single securely stored base key may be used to decrypt different encrypted sequences that include different authentication keys.

Aspects of the present disclosure provide the functionality of a SIM card or other such identification applications to authenticate a device with another entity (e.g., a network). The utilization of the securely stored base key to decrypt an encrypted sequence or other such data that includes an authentication key may result in less circuitry, lower power consumption, and less storage space as opposed to the use of a SIM card. Furthermore, the use of the securely stored base key may result in additional flexibility for the device to be used by multiple subscribers as well as to authenticate with multiple mobile networks.

FIG. 1 illustrates an example environment 100 with a device including a secure key provisioning component. In general, the example environment 100 illustrates the use of a secure base key that is stored at a device (e.g., a mobile communications device) and which is used to authenticate the device with one or more mobile networks.

As shown in FIG. 1, the environment 100 illustrates an interaction between a device 110, a provisioning server 120, and a mobile network 130 for authenticating a user or subscriber of the device 110 to the mobile network 130 for using a communications function of the device 110 with the mobile network 130. The device 110 may be any type of device that may use a mobile network. For example, the device may be a mobile communications device (e.g., a smart phone) or an IoT device. Furthermore, the device 110 may include a secure key provisioning component 115 that may generate an authentication result (e.g., a cryptographic proof) by using a base key that is stored in hardware of the device 110 and an authentication key that is stored in the software of the device 110. The provisioning server 120 may provide one or more encrypted sequences (e.g., one or more instructions to be performed by the hardware of the device 110 and the authentication key). The device 110 may decrypt the encrypted sequence by using the base key to obtain the authentication key. The provisioning server may further provide a challenge value (e.g., a random number or an alphanumeric sequence) to the device 110 and the secure key provisioning component 115 may subsequently generate the authentication result based on the authentication key and the challenge value as described in further detail below. The authentication result generated by the secure key provisioning component 115 of the device 110 may then be provided to the mobile network 130 for authenticating the device 110. For example, the mobile network 130 may generate another authentication result based on an authentication key and the challenge value received from the provisioning server 120. The authentication result generated by the mobile network 130 may be compared with the authentication result transmitted from the device 110 to determine whether to authenticate the device 110 with the mobile network 130. If the authentication results match, then the device 110 may be considered to be successfully authenticated with the mobile network 130. Otherwise, if the authentication results do not match, then the device 110 may not be considered to be successfully authenticated with the mobile network 130.

Figure 2:
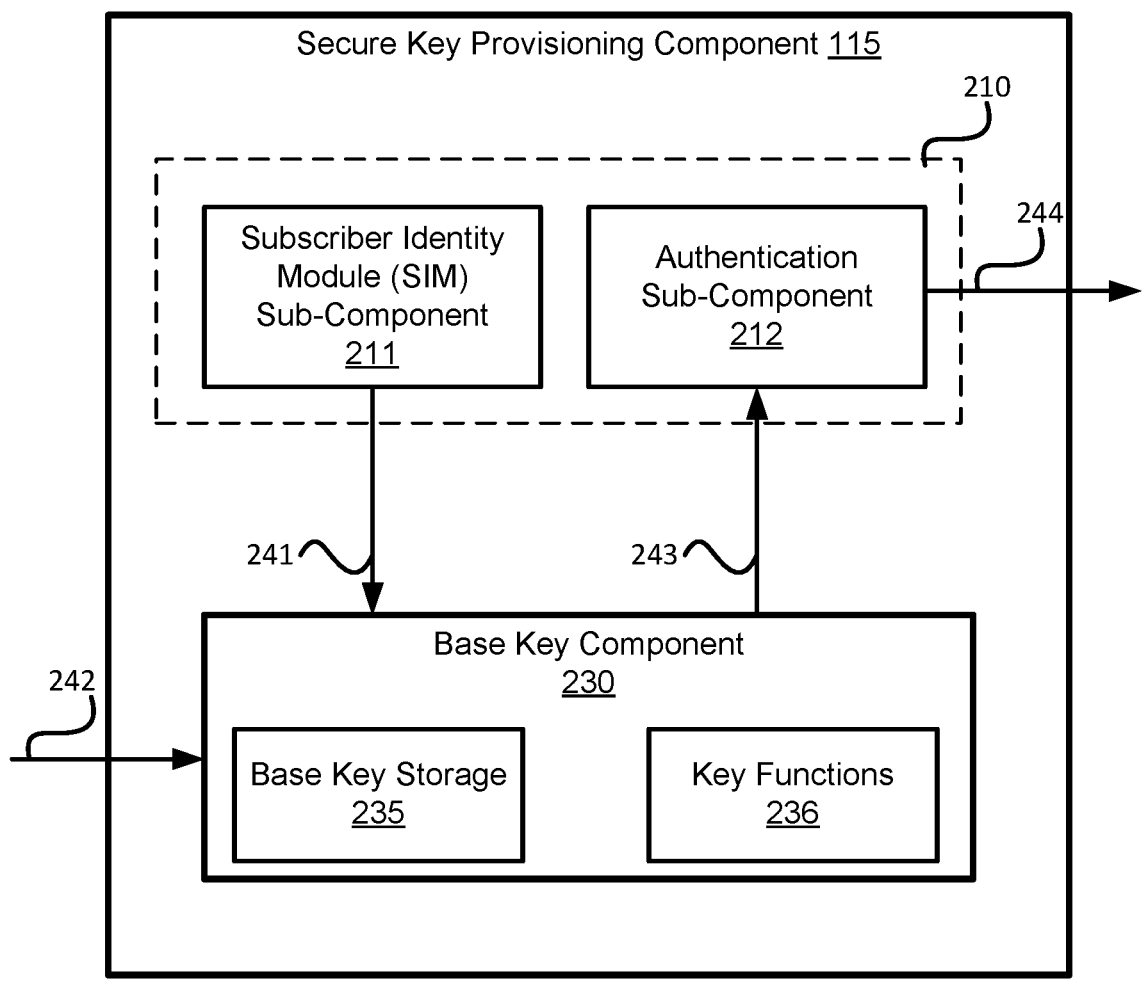
FIG. 2 is a block diagram of an example secure key provisioning component in accordance with some embodiments.

FIG. 2 is a block diagram of an example secure key provisioning component 115. The secure key provisioning component 115 may be used in a device (e.g., device 110 of FIG. 1) to authenticate the device with a mobile network (e.g., mobile network 130 of FIG. 1) with an authentication result that is based on a combination of a base key and a challenge value.

As shown in FIG. 2, the secure key provisioning component 115 may include an embedded software component 210 that includes a subscriber identity module (SIM) sub-component 211 that stores one or more encrypted sequences where each encrypted sequence may include an authentication key and one or more instructions. The embedded software component 210 may correspond to an embedded software in a non-secure environment. Each encrypted sequence may be assigned to a particular user or subscriber of a mobile network. The encrypted sequences may be received from a provisioning server. The embedded software component 210 may further include an authentication sub-component 212 that may be used to perform an authentication process between an ephemeral key and a challenge value. The ephemeral key may be based on the authentication key. The secure key provisioning component 115 may further include a hardware base key component 230 that may correspond to a secure environment. For example, the base key component 230 may be a Root of Trust (RoT) component that provides a set of functions that is trusted by the embedded software of the secure provisioning component 115. As an example, the base key component 230 may receive one or more instructions from an external source (e.g., from an encrypted sequence as described in further detail) and may authenticate the one or more instructions and then perform the one or more instructions based on the set of functions. The base key component 230 may include a base key storage 235 that stores a base key and a key functions sub-component 236 that may perform one or more operations with one or more keys. In some embodiments, the base key storage 235 may store the base key in a one-time programmable (OTP) memory or within the silicon of the base key storage 235 at the time of manufacturing of the hardware of the secure key provisioning component 115. The base key that is stored may be unique to the device that includes the secure key provisioning component 115. For example, a group of devices that include the secure key provisioning component 115 may be manufactured and a different base key may be stored in each secure key provisioning component of each of the devices in the group.

In operation, the secure key provisioning component 115 may receive an indication to provide an authentication result for a device that includes the secure key provisioning component 115. For example, the device may seek to use a communications function with a mobile network. In response to the indication, the mobile network may provide a request for an identity of a subscriber of the mobile network that is using the device. The secure key provisioning component 115 may provide an IMSI number to the mobile network where the IMSI number corresponds to an encrypted sequence that is stored at the SIM sub-component 211. The encrypted sequence may include an authentication key that is assigned to the IMSI number. Subsequently, the SIM sub-component 211 may provide the encrypted sequence 241 to the base key component 230 which may use the base key stored at the base key storage 235 to decrypt the received encrypted sequence 241 and obtain an authentication key that is assigned to the IMSI number. The base key component 230 may further receive a challenge value 242 (e.g., a random number) from a provisioning server. In some embodiments, the challenge value may be received from a first channel (e.g., a Wi-Fi connection) and a second channel (e.g., using the mobile network) may be between the device and the mobile network where the second channel is different than the first channel. The key functions sub-component 236 may be used to combine the authentication key with the challenge value to generate an ephemeral key 243. Thus, the base key stored at the base key storage 235 is not transmitted externally from the base key component 230. In some embodiments, the key functions sub-component 236 may include a key tree component as described in further detail in conjunction with FIG. 6. The key tree component may be used to combine a challenge value and the authentication key to generate an ephemeral key. The authentication sub-component 212 may perform an authentication process with the ephemeral key 243. For example, as described in further detail below, the ephemeral key may be combined with the challenge value to generate an authentication result 244. Furthermore, the device may provide the authentication result 244 to a mobile network for authenticating the device with the mobile network.

Figure 3:
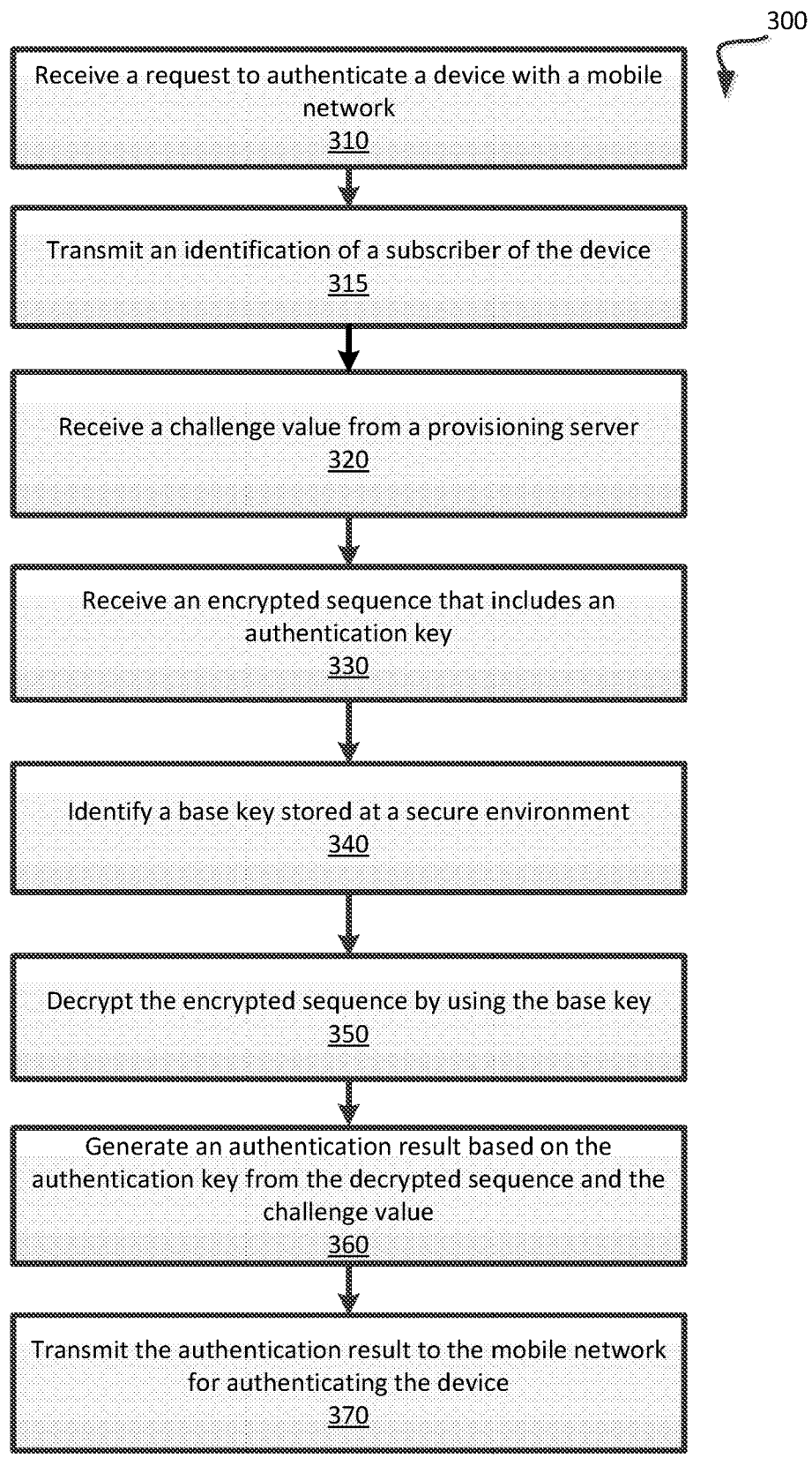
FIG. 3 is a flow diagram of an example method to generate an authentication result by using a secure base key in accordance with some embodiments.

FIG. 3 is a flow diagram of an example method 300 to generate an authentication result by using a secure base key. In general, the method 300 may be performed by processing logic that may include hardware (e.g., processing device, circuitry, dedicated logic, programmable logic, microcode, hardware of a device, etc.), software (e.g., instructions run or executed on a processing device), or a combination thereof. The method 300 may be performed by the secure key provisioning component 115 of FIG. 1 or 2.

As shown in FIG. 3, the method 300 may begin with the processing logic receiving a request to authenticate a device with a mobile network (block 310). For example, the request may be received in response to the device initiating a communications function with the mobile network. The request may correspond to a request for an identity of a subscriber of the device. The processing logic may subsequently transmit an identification of the subscriber of the device to the mobile network (block 315). For example, an IMSI number of the subscriber may be provided from the device to the mobile network. Subsequently, the processing logic may receive a challenge value from a provisioning server (block 320). The challenge value may be a random value that is received by the device after transmitting the IMSI number to the mobile network. In some embodiments, the challenge value may be received by the device from the mobile network after the mobile network receives the challenge value from the provisioning server. As described in further detail below, the same challenge value may also be provided to the mobile network by the provisioning server.

The processing logic may further receive an encrypted sequence that includes an authentication key (block 330). The encrypted sequence may include one or more instructions to be performed by a secure environment (e.g., the base key component 230 of the secure key provisioning component 115) and an authentication key. The one or more instructions may specify a series and/or order of instructions to be performed by components of the secure environment. For example, the one or more instructions may specify when to combine a base key with a challenge value to generate a device ephemeral key and when to transmit the device ephemeral key externally from the secure environment. In some embodiments, an encrypted sequence out of multiple encrypted sequences may be selected based on the identification of the subscriber of the device that is seeking to authenticate with the mobile network or the identification of a particular mobile network. Thus, the device may include multiple encrypted sequences where each encrypted sequence may correspond to a different subscriber and/or a different mobile network (e.g., a particular user may be a subscriber to different mobile networks). The encrypted sequence may be retrieved by a hardware secure environment from an embedded software unsecure environment. The processing logic may further identify a base key that is stored at a secure environment (block 340). For example, a base key stored within the base key component may be retrieved. Subsequently, the processing logic may decrypt the encrypted sequence by using the base key (block 350). Thus, the authentication key may be retrieved after decrypting the encrypted sequence. The processing logic may further generate an authentication result based on the authentication key from the decrypted sequence and the challenge value (block 360). For example, an authentication process may be used to combine the authentication key with the challenge value to generate an ephemeral key and the authentication result may be generated by combining the ephemeral result with the same challenge value. In some embodiments, the combining operation may correspond to a cryptographic operation between the received inputs to generate a key (e.g., the ephemeral key). Examples of such cryptographic operations include, but are not limited to, Advanced Encryption Standard (AES) operations, Data Encryption Standard (DES) operations, Triple Data Encryption Standard (3DES) operations, an exlusive-xor (XOR) operation, etc. For example, the output of the combining operation may be a result of an encryption operation between the received inputs (e.g., the challenge value and an ephemeral key). The combining operation may be based on a key tree component as described in further detail with regards to FIG. 6.

Subsequently, the processing logic may transmit the authentication result to the mobile network for authenticating the device (block 370). As described in further detail with regard to FIG. 4, the authentication result transmitted by the device may be compared with another authentication generated by the mobile network to authenticate the device. For example, if the authentication result transmitted by the device matches the authentication result generated by the mobile network, then the device may be considered to be successfully authenticated. Otherwise, if the authentication result transmitted by the device does not match the authentication result generated by the mobile network, then the device may not be considered to be successfully authenticated.

As such, a base key stored within the hardware of the device may be used to decrypt an encrypted sequence that includes an authentication key that is assigned to a particular subscriber for a particular mobile network or a particular subscription of a particular mobile network. The same base key may be used to decrypt any encrypted sequence that is received by the hardware of the device. For example, the device may store a first encrypted sequence that includes a first authentication key that is assigned to a first subscriber. The device may further store a second encrypted sequence that includes a second authentication key that is assigned to a second subscriber. The first encrypted sequence may be decrypted by the base key when the first subscriber attempts to authenticate the device with the mobile network. Thus, the first authentication key may be retried by decrypting the first encrypted sequence with the base key and a first authentication result may be generated by combining the first authentication key with the challenge value. At a later time, the second subscriber may seek to authenticate the same device with the mobile network. Subsequently, the second encrypted sequence may be retrieved and decrypted by the same base key that previously decrypted the first encrypted sequence. Similarly, a second authentication result may be generated by a combination of the second authentication key and a second challenge value. Thus, different users may use the same device to authenticate with a mobile network or with different mobile networks. In some embodiments, a user may provide a code or alphanumeric string (e.g., a personal identification number (PIN)) to retrieve an encrypted sequence to be decrypted by the secure key provisioning component. For example, a different PIN may be assigned to each encrypted sequence and a user may provide the PIN for a particular encrypted sequence to be retrieved. In some embodiments, the ephemeral key generated by the device may further be based on the PIN provided by the user. Furthermore, the network operator of the mobile network may include a database that assigns each encrypted sequence with a PIN and the ephemeral key generated by the mobile network may further be based on the PIN known to the network operator of the mobile device.

Figure 4:
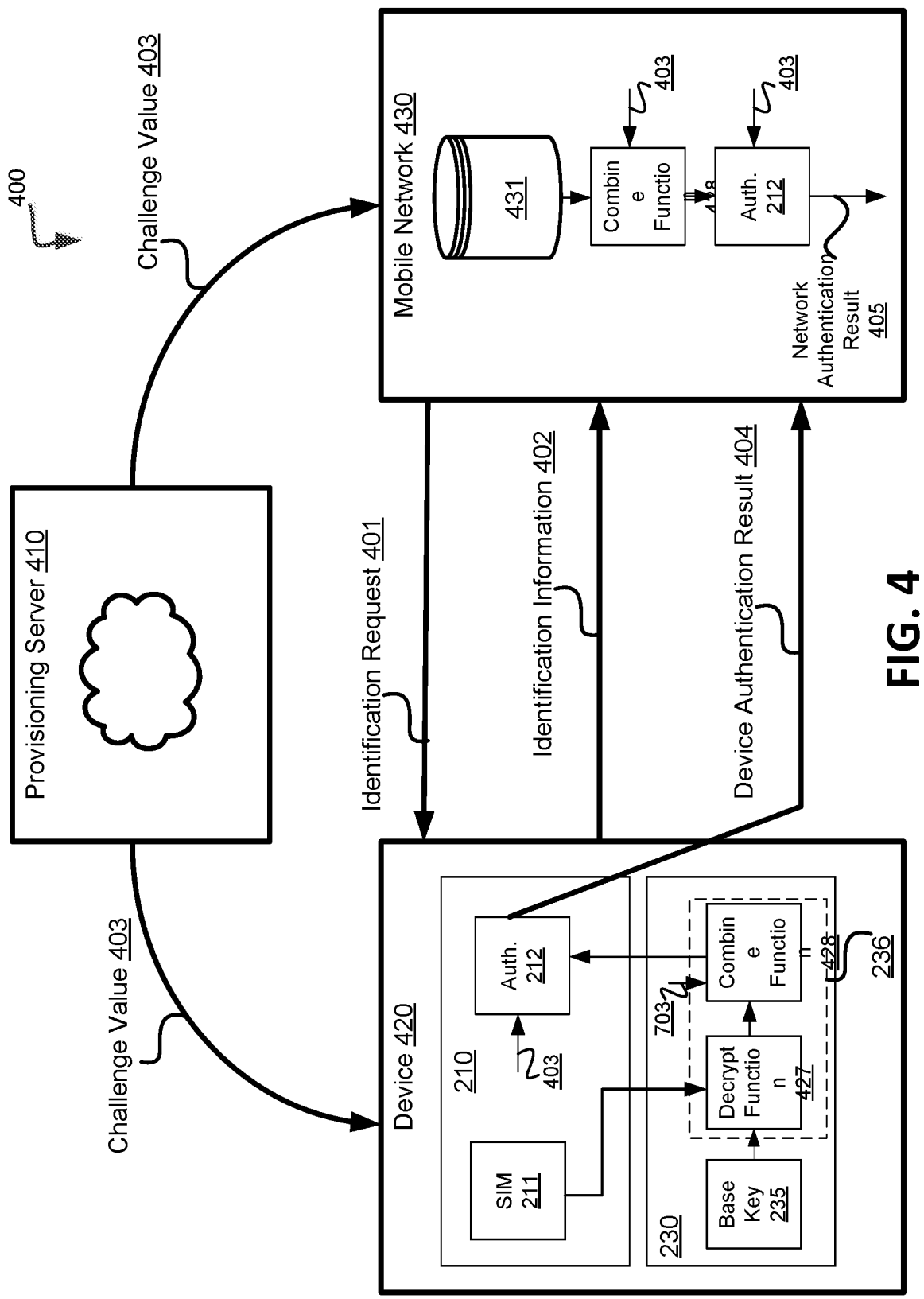
FIG. 4 illustrates an example environment to generate an authentication result in accordance with some embodiments of the present disclosure.

FIG. 4 illustrates an example environment 400 to generate an authentication result. In general, the environment 400 may correspond to the device identification key generator 100 or 200 of FIG. 1 or 2. The environment 400 may include a provisioning server 410 that corresponds to the provisioning server 120 of FIG. 1, a device 420 that corresponds to the device. 110 of FIG. 1, and a mobile network 430 that corresponds to the mobile network 130 of FIG. 1.

As shown in FIG. 4, the provisioning network 410 may provide a challenge value 403 to each of the device 420 and the mobile network 430. For example, the same challenge value may be provided to each of the device 420 and the mobile network 430. The challenge value 403 may be provided to the device 420 via a side channel or a different channel (e.g., WiFi) than a mobile network channel or other such communications channel between the device 420 and the mobile network 430. In some embodiments, the challenge value 403 may not be provided to the device 420 from the provisioning network 410, but may be provided to the device from the mobile network 430 after the mobile network 430 receives the challenge value 403 from the provisioning network 410. The device 421 may include a non-secure embedded software component 210 that includes the SIM sub-component 211 and the authentication sub-component 212 as well as a secure base key component 230 that includes the base key storage sub-component 235 and the key functions sub-component 236 that includes a decrypt function 427 and a combine function 428. The mobile network 430 may include a database 431 that identifies an authentication key that is associated with each subscriber of the mobile network. For example, the database may identify a particular authentication key that is assigned to a particular IMSI number. The mobile network 430 may further include the same combine function 428 and the same authentication sub-component 212 that are also present at the device 420.

In operation, the mobile network 430 may transmit an identification request 401 to the device 420. In response to receiving the identification request 401, the device 420 may provide identification information 402 to the mobile network. The identification information 402 may correspond to an IMSI of a subscriber. The device 420 and the mobile network 430 may then each receive the challenge value 403 from the provisioning server 410. An encrypted sequence that includes an authentication key corresponding to the IMSI of the subscriber may be retrieved from the SIM sub-component 211 and the encrypted sequence may be decrypted by the decrypt function 427 that uses the base key stored at the base key storage sub-component 235 to decrypt the encrypted sequence. The combine function 428 may receive the authentication key from the decrypted sequence and may also receive the challenge value 403 and may combine the challenge value 403 with the authentication key to generate a device ephemeral key. Subsequently, the device ephemeral key may be transmitted from the secure environment to the non-secure environment to be combined with the challenge value 403 for generating a device authentication result 404. The device 420 may then transmit the device authentication result 404 to the mobile network 430 for authenticating the device 420. Furthermore, the mobile network 430 may retrieve an authentication key that is assigned to the IMSI of the identification information 402 in the database 431. The mobile network 430 may then use the combine function 428 to combine the authentication key from the database 431 with the challenge value 403 to generate a network ephemeral key. Furthermore, the authentication sub-component 212 may combine the network ephemeral key with the challenge value 403 to generate the network authentication result 405. The device 420 may be authenticated based on a comparison between the device authentication result 404 and the network authentication result 405.

In some embodiments, authentication between the device 420 may be based on a roaming network. For example, the device 420 may be associated with a subscriber of the mobile network 430, but may not be in communication with the mobile network 430. Instead, the device may be in communication with a visited network. In such a case, the mobile network 430 may provide the challenge value and the corresponding network authentication result to the visited network which may then compare the received device authentication result with the network authentication result that is received from the mobile network 430.

In some embodiments, the base key stored at the device 420 may be combined with the challenge value to generate the device authentication result. For example, the base key may be combined with the challenge value to generate the device ephemeral key. The device ephemeral key may then be combined with the challenge value to generate the device authentication result. The mobile network may retrieve the base key from the database that assigns the base key to an IMSI and may similarly combine the base key with the challenge value to generate a network ephemeral key which is subsequently combined with the challenge value to generate the network authentication result.

In an alternative embodiment, the encrypted sequence may include a mobile network index that is combined with the base key stored at the device to generate a mobile network base key which may subsequently be combined with the challenge value to generate the device ephemeral key. The provisioning server may then provide the mobile network with the mobile network base key which may be combined with the challenge value to generate the network ephemeral key. In such a case, the provisioning server may be associated with multiple mobile networks and each mobile network may authenticate subscribers of devices with different mobile network base keys so that no base key is common to multiple mobile networks.

Figure 5:
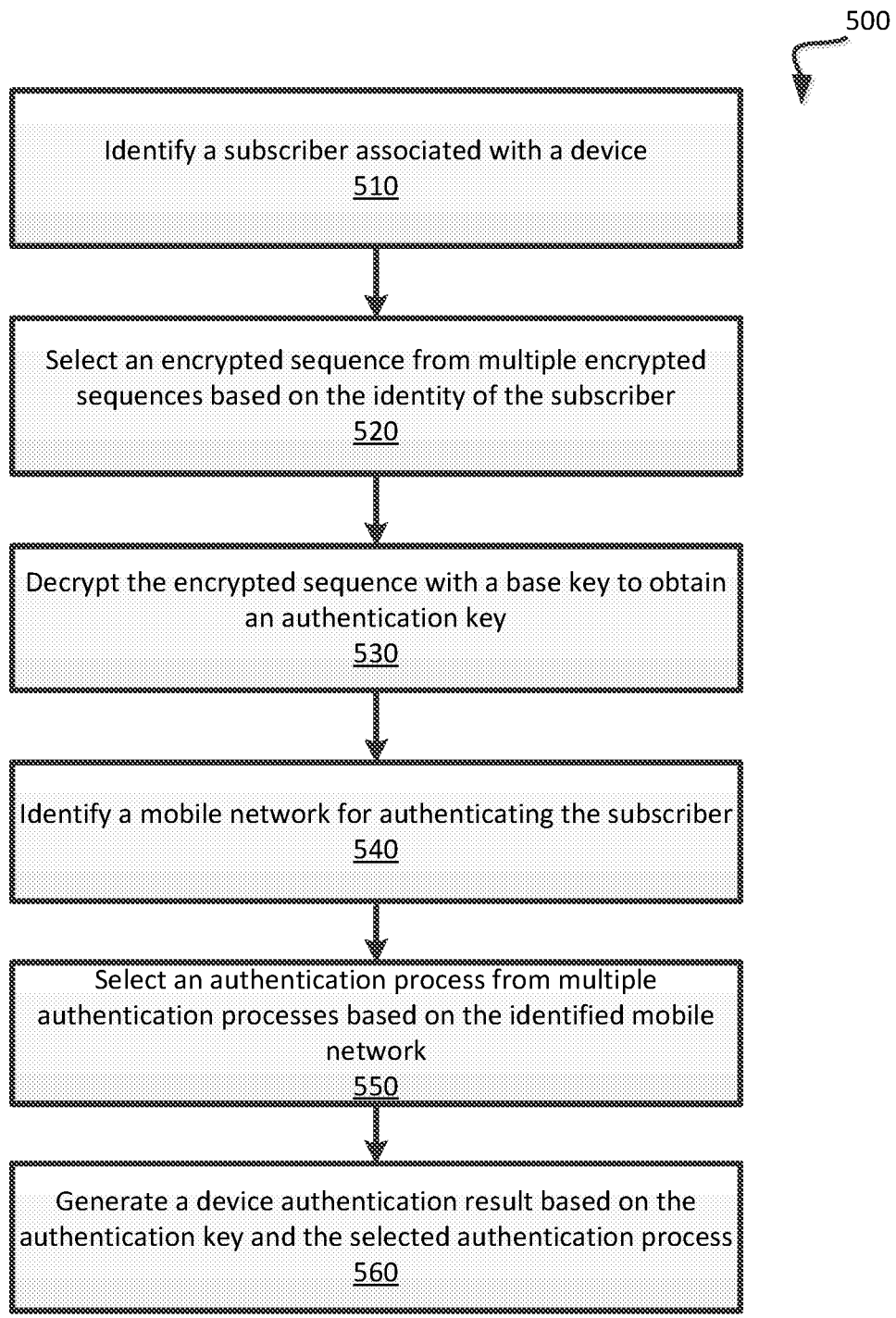
FIG. 5 is a flow diagram of an example method to generate an authentication result based on a subscriber identity and an identified mobile network in accordance with some embodiments.

FIG. 5 is a flow diagram of an example method 500 to generate an authentication result based on a subscriber identity and an identified mobile network. In general, the method 500 may be performed by processing logic that may include hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the secure key provisioning component 115 of FIG. 1 or 2.

As shown in FIG. 5, the method 500 may begin with the processing logic identifying a subscriber associated with a device (block 510). For example, the subscriber may be a user of a mobile network who seeks to authenticate the device with the mobile network. The processing logic may subsequently select an encrypted sequence from multiple encrypted sequences based on the identity of the subscriber (block 520). For example, the device may include multiple encrypted sequences where each encrypted sequence is assigned to a different subscriber of one or more mobile networks. The processing logic may decrypt the selected encrypted sequence with a base key to obtain an authentication key (block 530). Furthermore, the processing logic may identify a mobile network for authenticating the subscriber (block 540). For example, multiple different mobile networks may authenticate the subscriber and a particular mobile network may be selected. In response to the selected mobile network, the processing logic may select an authentication process from multiple authentication processes based on the identified mobile network (block 550). For example, the non-secure software environment of the device may include different authentication processes where each authentication process is assigned to a particular mobile network. The processing logic may subsequently generate a device authentication result based on the authentication key and the selected authentication process (block 560). For example, a device ephemeral key may be generated based on the authentication key and a challenge value. The device ephemeral key may be combined with the challenge value by using the selected authentication process.

As such, a different authentication key may be used to generate the device ephemeral key based on different subscribers using the device. The same base key may be used to decrypt the encrypted sequences assigned to the different subscribers. Furthermore, a different authentication process may be used to generate an authentication result for different mobile networks for which the subscriber is attempting to authenticate the device.

Figure 6:
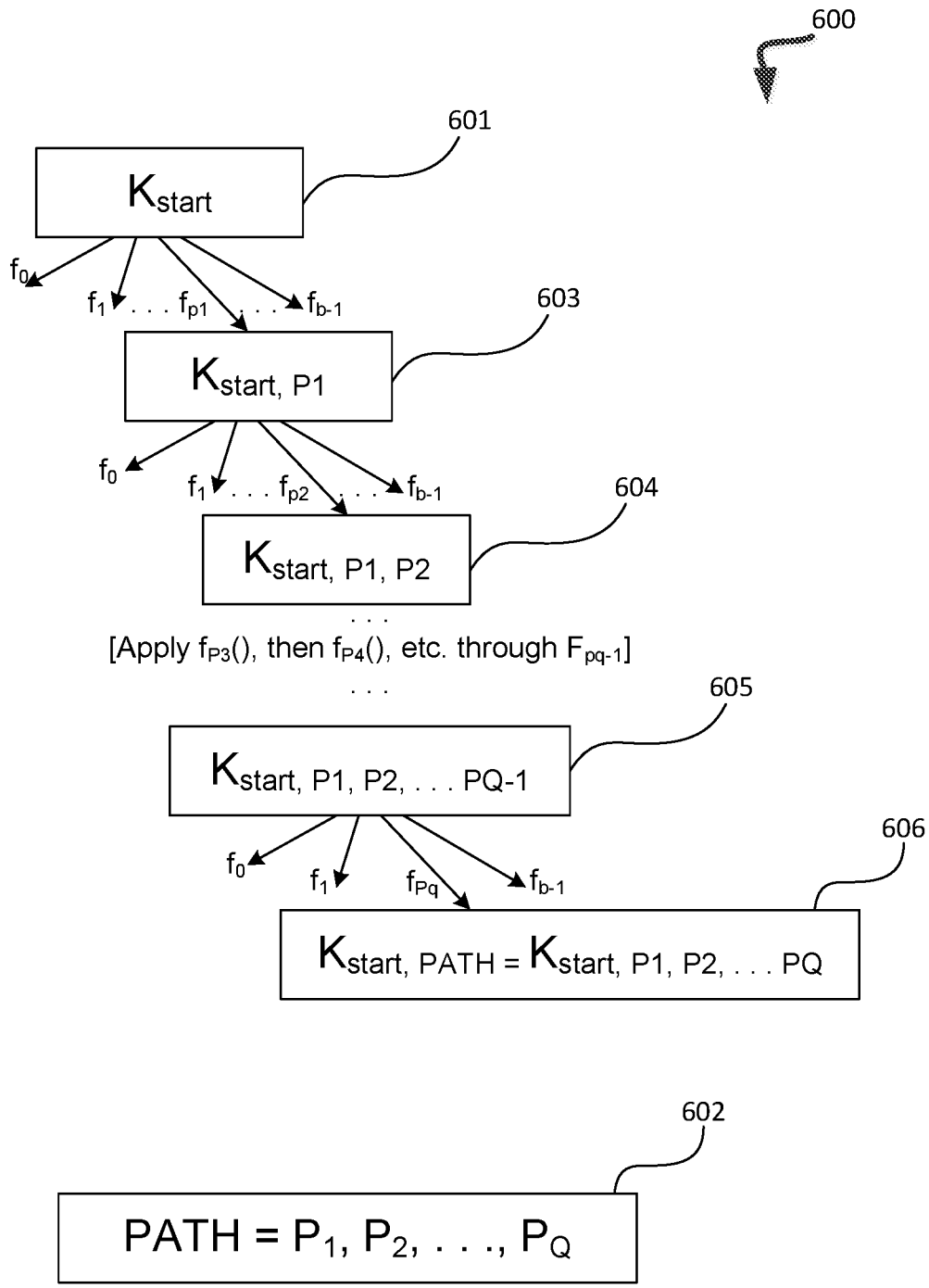
FIG. 6 is a block diagram of an example key tree component in accordance with some embodiments.

FIG. 6 is a block diagram of an example key tree 600. In general, the key tree 600 may correspond to a one way function component such as the combine function 428 of FIG. 4. The key tree 600 may receive a first input (e.g., an authentication key) and a second input (e.g., a challenge value) and generate an ephemeral key (e.g., the device ephemeral key or the network ephemeral key).

The key tree 600 may perform an entropy redistribution operation. As used herein, an "entropy redistribution operation" (or "entropy distribution operation") may be an operation that mixes its input(s) (e.g., the authentication key and the challenge value) such that unknown information about input bits is redistributed among the output bits. For example, suppose an x bit cryptographic key $K_0$ is processed repeatedly with an entropy redistribution operation f such that key $K_i=f(K_{i-1})$ for each i>1. Next, suppose an adversary obtains y bits of information (e.g., obtained as part of an attempted external monitoring attack) about each of n different keys $K_i$, providing more than enough information to solve for key $K_0$, (e.g., y*n>x). The use of the entropy distribution operation f may make such solution computationally infeasible. A cryptographic hash function H is an example of an operation that may be used as an entropy redistribution operation. For example, consider a strong hash function H that produces a 256-bit result. Given a random 256-bit initial key $K_0$, let $K_i=H(K_{i-1})$ for each i>1. An adversary with knowledge of (for example) the least-significant bit of each $K_0 \ldots K_{999,999}$ has 1,000,000 bits of data related to $K_0$. A hypothetical adversary with infinite computing power could find $K_0$ by testing all possible $2^{256}$ values for $K_0$ to identify a value which is consistent with the known sequence of least-significant bits. Actual adversaries have finite computational power available, however, and the entropy redistribution operation prevents there from being a computationally practical way to solve for $K_0$ (or any other $K_i$) given the information leaked through attempted external monitoring attacks.

Entropy redistribution operations may be implemented, without limitation, using cryptographic hash functions, operations constructed using block ciphers (such as AES), pseudorandom transformations, pseudorandom permutations, other cryptographic operations, or combinations thereof. Embodiments are described with respect to a hash, but those skilled in the art will understand that, pursuant to the foregoing, other entropy redistribution functions may also be used instead or in addition.

Multiple entropy redistribution operations may also be constructed from a base operation. By way of example, if two 256-bit entropy redistribution operations $f_0(\ )$ and $f_i(\ )$ are required, $f_0(\ )$ could comprise applying the SHA-256 cryptographic hash function to the operation identifier string "f0" concatenated with the input to $f_0(\ )$ while $f_1(\ )$ could comprise applying SHA-256 to the operation identifier string "f1" concatenated with the input to $f_1(\ )$. Entropy redistribution operations can be construed using the well-known AES block cipher. For example, to implement $f_0(\ ) \ldots f_{b-1}(\ )$ each $f_i(\ )$ can use its input as an AES-256 key to encrypt a pair of 128-bit input blocks that are unique to the choice of i within $0 \ldots b-1$, yielding 256 bits of output.

The key tree 600 may be able to compute a set of non-linear cryptographic entropy redistribution operations $f_0(\ ), f_1(\ ), \ldots, f_{b-1}(\ )$, where b>1 is a positive integer. These b entropy redistribution functions can be configured in a tree structure. For example, a simple b-ary tree structure of height Q (i.e., having Q+1 levels, from 0 through Q) can be created by using b distinct entropy distribution functions, $f_0(\ ) \ldots f_{b-1}(\ )$, to represent the b possible branches of this b-ary tree at each node of the tree, each node representing a possible derived base key. In such a tree, starting from a root cryptographic key $K_{START}$ (which is at level 0), b possible keys can be computed at level 1: $f_0(K_{START})$ for the leftmost branch; $f_1(K_{START})$ for the next branch; and continuing until $f_{b-1}(K_{START})$ for the rightmost branch. At level 2, $b^2$ possible keys can be derived, since each of $f_0(\ ) \ldots f_{b-1}(\ )$ could be applied to each of the b possible level 1 keys. Computing a specific level 2 node may require two, not $b^2$, computations (i.e., the nodes not on the path are not computed). The tree continues for successive levels 1 through Q, where each possible key (i.e., a different node) of a prior level can be processed by applying $f_0(\ ) \ldots f_{b-1}(\ )$ in turn to derive b additional possible derived base keys. The entire key tree has Q+1 levels, starting with a single node at level 0, continuing with $b^i$ nodes at level i, and ending with $b^Q$ nodes at level Q. Thus, there are $b^Q$ possible paths from the root node at level 0 to the $b^Q$ final nodes at level Q. Each such possible path, corresponding to a unique the sequence of functions applied at the different levels, can be represented as a sequence of Q integers, each integer being selected from $(0 \ldots b-1)$. For example, in an exemplary embodiment, b=2. Thus, two entropy redistribution operations, $f_0(\ )$ and $f_1(\ )$ are used (and may be constructed from a base operation, e.g., as described above). If Q=128 (i.e., the height is 128), $2^{128}$ paths are possible and 128 entropy redistribution function computations are required to derive the level Q key from the level 0 node (i.e., the starting key).

As a variation, embodiments may involve more variety in the choice of b, such as varying the value of b among levels, and/or varying b based on the route taken to a particular level. Likewise, the entropy redistribution operations can also be varied, such as by making the entropy redistribution operations $f_i(\ )$ differ at different levels or making these operations depend on the sequence taken to a particular level.

An example key derivation process is diagrammed in FIG. 6. The process begins with a starting point of the tree, which is denoted $K_{START}$(601), and a path $P_1 \ldots P_Q$(602). For example, $K_{START}$ may the value of the authentication key and path $P_1 \ldots P_Q$(602) may be the value based on the challenge value. The conversion of entity ID into $P_1 \ldots P_Q$ is discussed below. The path specifies a succession of entropy redistribution operations to be applied to $K_{START}$.

In an implementation, entity ID $H_1$ is decomposed into Q parts $P_1, P_2, \ldots, P_Q$. In an example decomposition, each part $P_i$ is an integer from 0 thru (b−1) (e.g., if b=4 then each $P_i$ is a two-bit value (0, 1, 2, or 3)). Likewise, if b=2, each $P_i$ is a single bit (0 or 1). Hence, the path parts $P_1 \ldots P_Q$ can be used to specify a specific path from $K_{START}$ to $K_{START,PATH}$ by applying functions $f_0(\ ), f_1(\ ) \ldots, f_{b-1}(\ )$ to produce a plurality of intermediate keys leading to $K_{START,PATH}$ as follows. First, the function $f_{P\ 1}$ is applied to $K_{START}$(603) to yield an intermediate key $K_{START,P\ 1}$, followed by the application of $f_{P\ 2}$ on $K_{START,P\ 1}$ to yield the intermediate key $K_{START,P\ 1,P\ 2}$(604) and so on, until the final application of $f_{P\ Q}$ on the intermediate key $K_{START,P\ 1,P\ 2\ \ldots\ P\ Q-1}$(605) to yield the final derived base key, $K_{START,P\ 1,P\ 2,\ldots\ P\ Q}$(606). Note that the derivation of each intermediate key depends on at least one predecessor key and the relevant portion of the message identifier. For convenience, this final derived key (e.g., the ephemeral key) may be denoted with the notation $K_{START,PATH}$ (indicating the key that was reached by starting with $K_{START}$ and following PATH).

Figure 7:
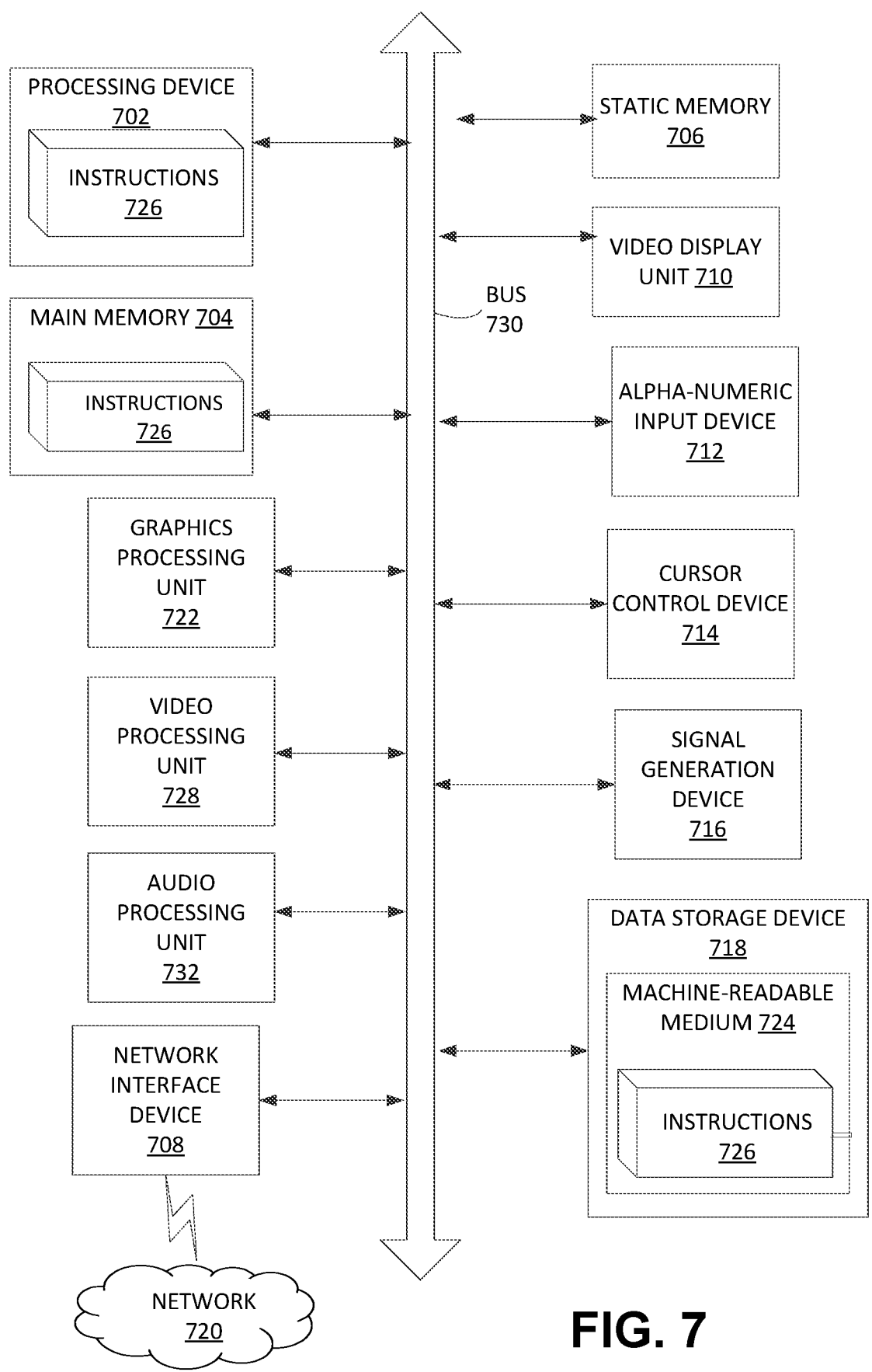
FIG. 7 illustrates a block diagram of an embodiment of a computer system in which some embodiments of the disclosure may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet via a network 720. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system may further include a network interface device 708. The computer system also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a video processing unit 728, an audio processing unit 732, and a signal generation device 716 (e.g., a speaker).

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system, the main memory 704 and the processing device 702 also constituting machine-readable storage media.

In one implementation, the instructions 726 include instructions to implement functionality corresponding to a secure key provisioning component (e.g., secure key provisioning component 115 of FIG. 1 or 2). While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving an encrypted sequence comprising an authentication key, wherein the encrypted sequence further comprises one or more instructions, the one or more instructions to be performed by a secure hardware component in a secure area of a device;
   identifying a base key stored in the secure area of the device before the encrypted sequence is received;
   decrypting the encrypted sequence with the base key to obtain the authentication key;
   receiving a challenge value;
   combining the authentication key with the challenge value to generate a device ephemeral key;
   generating, by a processing device, an authentication result for the device based on a combination of the device ephemeral key and the challenge value; and
   transmitting the authentication result to a mobile network to authenticate the device.

2. The method of claim 1, wherein the encrypted sequence is received from a non-secure environment, and wherein the base key is stored within the secure area of the device at manufacturing of the secure hardware component.

3. The method of claim 1, wherein receiving the encrypted sequence comprising the authentication key comprises:
   receiving an identification of a subscriber from a plurality of subscribers associated with the device; and
   selecting the encrypted sequence from a plurality of encrypted sequences stored at the device based on the identification of the subscriber, wherein each of the encrypted sequences corresponds to a different subscriber.

4. The method of claim 1, wherein generating the authentication result for the device comprises:
   receiving an identification of the mobile network from a plurality of mobile networks associated with the device; and
   selecting an authentication process from a plurality of authentication processes stored at the device, the authentication result being generated by combining the device ephemeral key with the challenge value by using the selected authentication process from the plurality of authentication processes stored at the device.

5. The method of claim 1, wherein receiving the encrypted sequence comprising the authentication key comprises:
   receiving the encrypted sequence from a provisioning server over a side channel that is different than a communications channel between the device and the mobile network, and wherein the challenge value is received from the provisioning server over the side channel.

6. The method of claim 1, wherein the encrypted sequence corresponds to a first subscriber, the method further comprising:
   in response to a request to authenticate the device with a second subscriber, receiving a second encrypted sequence comprising a second authentication key that corresponds to the second subscriber; and
   decrypting the second encrypted sequence with the same base key that was used to decrypt the encrypted sequence corresponding to the first subscriber, the decrypting of the second encrypted sequence being to obtain the second authentication key.

7. The method of claim 1, wherein the challenge value corresponds to a random number received from a provisioning server, the challenge value being further received by the mobile network, the method further comprising:

receiving a request, from the mobile network, for an identification associated with the device; and transmitting the identification from the device to the mobile network, the identification to be used by the mobile network to retrieve a copy of the authentication key that is stored at the mobile network and to generate a network authentication result to be compared with the authentication result generated by the device.

8. A system comprising:

a memory storing instructions;

a secure hardware component in a secure area of a device; and a processing device, operatively coupled with the memory and configured to execute the instructions, to:

receive an encrypted sequence comprising an authentication key, wherein the encrypted sequence further comprises one or more instructions, the one or more instructions to be performed by the secure hardware component;

identify a base key stored in the secure area of the device before the encrypted sequence is received;

decrypt the encrypted sequence with the base key to obtain the authentication key;

receive a challenge value;

combine the authentication key with the challenge value to generate a device ephemeral key;

generate an authentication result for the device based on a combination of the device ephemeral key and the challenge value; and transmit the authentication result to a mobile network to authenticate the device.

9. The system of claim 8, wherein the encrypted sequence is received from a non-secure environment, wherein the base key is stored within the secure area of the device at manufacturing of the secure hardware component.

10. The system of claim 8, wherein to receive the encrypted sequence comprising the authentication key, the processing device is further to:

receive an identification of a subscriber from a plurality of subscribers associated with the device; and select the encrypted sequence from a plurality of encrypted sequences stored at the device based on the identification of the subscriber, wherein each of the encrypted sequences corresponds to a different subscriber.

11. The system of claim 8, wherein to generate the authentication result for the device, the processing device is further to:

receive an identification of the mobile network from a plurality of mobile networks associated with the device; and select an authentication process from a plurality of authentication processes stored at the device, the authentication result being generated by combining the device ephemeral key with the challenge value by using the selected authentication process from the plurality of authentication processes stored at the device.

12. The system of claim 8, wherein to receive the encrypted sequence, the processing device is further to:

receive the encrypted sequence from a provisioning server over a side channel that is different than a communications channel between the device and the mobile network, and wherein the challenge value is received from the provisioning server over the side channel.

13. The system of claim 8, wherein the encrypted sequence corresponds to a first subscriber, the processing device is further to:

in response to a request to authenticate the device with a second subscriber, receive a second encrypted sequence comprising a second authentication key that corresponds to the second subscriber; and decrypt the second encrypted sequence with the same base key that was used to decrypt the encrypted sequence corresponding to the first subscriber, the decrypting of the second encrypted sequence being to obtain the second authentication key.

14. The system of claim 8, wherein the challenge value corresponds to a random number received from a provisioning server, the challenge value being further received by the mobile network, and wherein the processing device is further to:

receive a request, from the mobile network, for an identification associated with the device; and transmit the identification from the device to the mobile network, the identification to be used by the mobile network to retrieve a copy of the authentication key that is stored at the mobile network and to generate a network authentication result to be compared with the authentication result generated by the device.

15. A non-transitory computer readable medium storing instructions that, when executed by a processing device, cause the processing device to perform operations comprising:

receiving an encrypted sequence comprising an authentication key, wherein the encrypted sequence further comprises one or more instructions, the one or more instructions to be performed by a secure hardware component in a secure area of a device;

identifying a base key stored in the secure area of the device before the encrypted sequence is received;

decrypting the encrypted sequence with the base key to obtain the authentication key;

receiving a challenge value;

combining the authentication key with the challenge value to generate a device ephemeral key;

generating an authentication result for the device based on a combination of the device ephemeral key and the challenge value; and transmitting the authentication result to a mobile network to authenticate the device.

16. The non-transitory computer readable medium of claim 15, wherein the encrypted sequence is received from a non-secure environment, wherein the base key is stored within the secure area of the device at manufacturing of the secure hardware component.

17. The non-transitory computer readable medium of claim 15, wherein to receive the encrypted sequence comprising the authentication key, the operations further comprise:

receiving an identification of a subscriber from a plurality of subscribers associated with the device; and selecting the encrypted sequence from a plurality of encrypted sequences stored at the device based on the identification of the subscriber, wherein each of the encrypted sequences corresponds to a different subscriber.

18. The non-transitory computer readable medium of claim 15, wherein to generate the authentication result for the device, the operations further comprise:
receiving an identification of the mobile network from a plurality of mobile networks associated with the device; and
selecting an authentication process from a plurality of authentication processes stored at the device, the authentication result being generated by combining the device ephemeral key with the challenge value by using the selected authentication process from the plurality of authentication processes stored at the device.

19. The non-transitory computer readable medium of claim 15, wherein to receive the encrypted sequence comprising the authentication key, the operations further comprise:
receiving the encrypted sequence from a provisioning server over a side channel that is different than a communications channel between the device and the mobile network, and wherein the challenge value is received from the provisioning server over the side channel.

20. The non-transitory computer readable medium of claim 15, wherein the encrypted sequence corresponds to a first subscriber, the operations further comprising:
in response to a request to authenticate the device with a second subscriber, receiving a second encrypted sequence comprising a second authentication key that corresponds to the second subscriber; and
decrypting the second encrypted sequence with the same base key that was used to decrypt the encrypted sequence corresponding to the first subscriber, the decrypting of the second encrypted sequence being to obtain the second authentication key.

* * * * *